US008447779B2

(12) United States Patent
Viripaeff et al.

(10) Patent No.: US 8,447,779 B2
(45) Date of Patent: *May 21, 2013

(54) ON-DEMAND DATABASE SERVICE SYSTEM, METHOD AND COMPUTER PROGRAM PRODUCT FOR CONDITIONALLY ALLOWING AN APPLICATION OF AN ENTITY ACCESS TO DATA OF ANOTHER ENTITY

(75) Inventors: Lexi Viripaeff, Novato, CA (US); Vinod Mehra, Fremont, CA (US); Alex Warshavsky, San Francisco, CA (US); Nate Horne, Walnut Creek, CA (US); Peter J. Dapkus, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/370,247

(22) Filed: Feb. 9, 2012

(65) Prior Publication Data
US 2012/0143916 A1 Jun. 7, 2012

Related U.S. Application Data

(63) Continuation of application No. 12/176,026, filed on Jul. 18, 2008, now Pat. No. 8,140,576.

(60) Provisional application No. 60/950,836, filed on Jul. 19, 2007.

(51) Int. Cl.
*G06F 17/30* (2006.01)

(52) U.S. Cl.
USPC ............ 707/781; 707/783; 707/784; 707/785

(58) Field of Classification Search
USPC .................... 707/781, 783, 784, 785
See application file for complete search history.

(56) References Cited

U.S. PATENT DOCUMENTS

| 5,857,191 | A | 1/1999 | Blackwell, Jr. et al. |
| 5,889,942 | A | 3/1999 | Orenshteyn |
| 6,163,878 | A | 12/2000 | Kohl |
| 6,219,667 | B1 * | 4/2001 | Lu et al. ................. 707/781 |
| 6,505,200 | B1 * | 1/2003 | Ims et al. ................ 707/781 |
| 6,732,087 | B1 * | 5/2004 | Hughes et al. ............ 707/783 |
| 6,996,574 | B2 | 2/2006 | Gluckman |
| 7,209,929 | B2 | 4/2007 | Dominguez, Jr. et al. |
| 7,698,160 | B2 | 4/2010 | Beaven et al. |
| 7,702,692 | B2 | 4/2010 | Chandrasekaran |
| 7,739,299 | B2 | 6/2010 | Kii et al. |
| 7,779,034 | B2 | 8/2010 | Pedersen et al. |
| 8,082,301 | B2 | 12/2011 | Ahlgren et al. |

(Continued)

OTHER PUBLICATIONS

U.S. Appl. No. 60/828,192, filed Oct. 4, 2006.

*Primary Examiner* — Wilson Lee
*Assistant Examiner* — Thuy Bui
(74) *Attorney, Agent, or Firm* — Zilka-Kotab, PC

(57) ABSTRACT

In accordance with embodiments, there are provided mechanisms and methods for conditionally allowing an application of an entity access to data of another entity in an on-demand database service. These mechanisms and methods for conditionally allowing an application of an entity access to data of another entity in an on-demand database service can enable embodiments to limit such access to the data, as desired. Furthermore, embodiments of such mechanisms and methods may provide additional security when sharing data among different subscribers to an on-demand database service.

13 Claims, 5 Drawing Sheets

U.S. PATENT DOCUMENTS

| | | |
|---|---|---|
| 8,095,413 B1 | 1/2012 | Beaven |
| 8,095,594 B2 | 1/2012 | Beaven et al. |
| 8,141,100 B2 * | 3/2012 | Ben-Natan et al. ........... 707/781 |
| 8,275,836 B2 | 9/2012 | Beaven et al. |
| 2003/0233404 A1 | 12/2003 | Hopkins |
| 2004/0230571 A1 | 11/2004 | Robertson |
| 2005/0065925 A1 | 3/2005 | Weissman et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2007/0220004 A1 | 9/2007 | Fifield et al. |
| 2008/0086479 A1 * | 4/2008 | Fry et al. ........................ 707/10 |
| 2010/0241595 A1 * | 9/2010 | Felsher ........................ 707/781 |

* cited by examiner

ON-DEMAND DATABASE SERVICE SYSTEM, METHOD AND COMPUTER PROGRAM PRODUCT FOR CONDITIONALLY ALLOWING AN APPLICATION OF AN ENTITY ACCESS TO DATA OF ANOTHER ENTITY

CLAIM OF PRIORITY

This application is a continuation of U.S. application Ser. No. 12/176,026, filed Jul. 18, 2008, which claims the benefit of U.S. Provisional Patent Application 60/950,836 entitled "METHOD AND SYSTEM FOR PARTNER SECURITY IN ON DEMAND SERVICES," by Lexi Viripaeff et al., filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to securely allowing access to data in database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to allow access to data in database systems by third party applications. To date, such data access has been provided with limited security measures, etc. For example, even if the third party application is generally authorized for data access, such authorization may, in turn, allow for broad-based access to all data, unlimited actions taken on such data, etc. Unfortunately, such limitations render such data subject to additional risk of undesired access by third parties.

BRIEF SUMMARY

In accordance with embodiments, there are provided mechanisms and methods for conditionally allowing an application of an entity access to data of another entity in an on-demand database service. These mechanisms and methods for conditionally allowing an application of an entity access to data of another entity in an on-demand database service can enable embodiments to limit such access to the data, as desired. Furthermore, embodiments of such mechanisms and methods may provide additional security when sharing data among different subscribers to an on-demand database service.

In an embodiment and by way of example, a method is provided for conditionally allowing an application of an entity access to data of another entity in an on-demand database service. In use, a request is received from an application created by a first entity. The request includes a request to access data of a second entity stored in a database of an on-demand database service. It is then determined whether the application is authorized to access the data of the second entity stored in the database of the on-demand database service. Conditional access is then allowed to the data of the second entity stored in the database of the on-demand database service, based on the foregoing determination.

While the present invention is described with reference to an embodiment in which techniques for conditionally allowing an application of an entity access to data of another entity in an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for conditionally allowing an application of an entity access to data of another entity in an on-demand database service.

To date, data access has been provided in the context of database systems with limited security measures, etc. Unfortunately, such limitations render such data subject to additional risk of undesired access by third parties. Thus, mechanisms and methods are provided herein for conditionally allowing an application of an entity access to data of another entity in an on-demand database service and to limit such access to the data, as desired. Additionally, embodiments of such mechanisms and methods may provide additional security when sharing data among different subscribers to an on-demand database service.

Next, mechanisms and methods for conditionally allowing an application of an entity access to data of another entity in an on-demand database service will be described with reference to exemplary embodiments.

Figure 1:
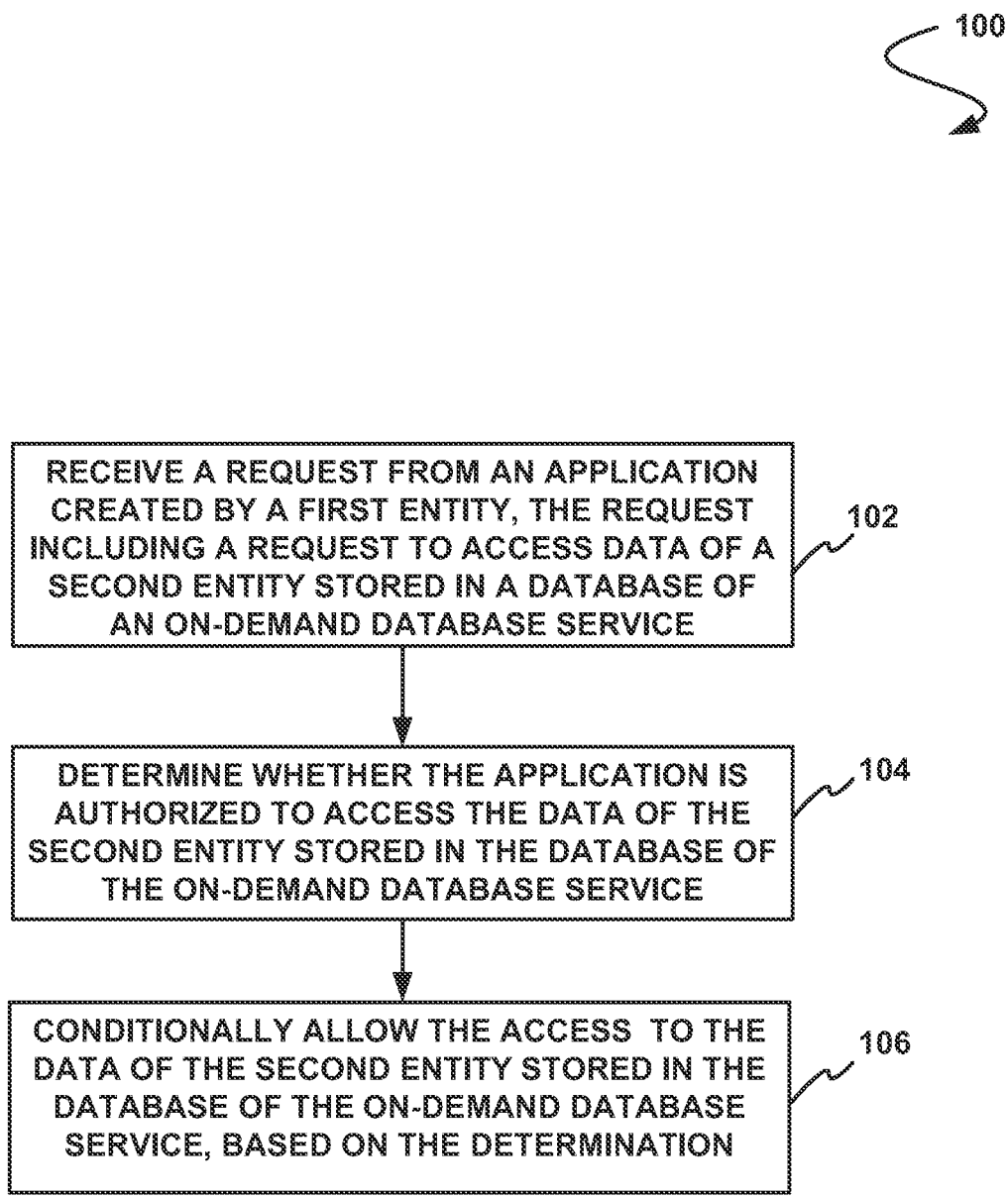
FIG. 1 shows a method for conditionally allowing an application of an entity access to data of another entity in an on-demand database service, in accordance with one embodiment.

FIG. 1 shows a method 100 for conditionally allowing an application of an entity access to data of another entity in an on-demand database service, in accordance with one embodiment. In operation, a request is received from an application created by a first entity. See operation 102. In this case, the request includes a request to access data of a second entity stored in a database of an on-demand database service.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Once the request is received from the application created by a first entity, it is determined whether the application is authorized to access the data of the second entity stored in the database of the on-demand database service. See operation 104. Furthermore, the access to the data of the second entity stored in the database of the on-demand database service is conditionally allowed, based on the determination. See operation 106.

In the context of the present description, an entity may refer to any individual, company, group, or organization. Furthermore, the first and second entities may include related entities (e.g. organizations within the same company, etc.) or unrelated entities (e.g. two separate companies, etc.). For example, in one embodiment, the first entity and the second entity may include different organizations. In another embodiment, the first entity and the second entity may include different divisions of a single organization.

Furthermore, the applications may include any computer code (e.g. a complete program, a partial program, a code segment, etc.) capable of being created by an entity. For example, in one embodiment, the application may include business logic. As an option, the application may be served by the on-demand database service.

In one embodiment, a plurality of data access limitations may be associated with the application. In this case, data access limitations refer to any limitation imposed on the ability to access data. For example, the data access limitations may include limitations on at least one action that may be performed on the data of the second entity stored in the database of the on demand database service.

As another example, the data access limitations may include limitations on at least one type of the data of the second entity stored in the database of the on-demand database service that can be accessed. Furthermore, the data access limitations may include a plurality of data access levels.

As an option, the data access limitations may be included with the application in a package. In this case, the package may be installed by the second entity. Additionally, the access to the data of the second entity stored in the database may be subject to the data access limitations.

In one embodiment, the data access limitations may be determined by the second entity. In this case, the data access limitations may be presented to the second entity for acceptance by the second entity. For example, the data access limitations may be presented to the second entity using a user interface. Using the user interface, the second entity may be allowed to accept or reject the access limitations. As an option, the access to the data of the second entity stored in the database of the on-demand database service may be conditionally allowed, based on the acceptance.

In still another embodiment, an update associated with the application may be received. For example, the update may be received as part of the package. After receiving the update, the update may be presented to the second entity for acceptance. In this case, the access to the data of the second entity stored in the database of the on-demand database service may be conditionally allowed utilizing the update, based on the acceptance.

Figure 2:
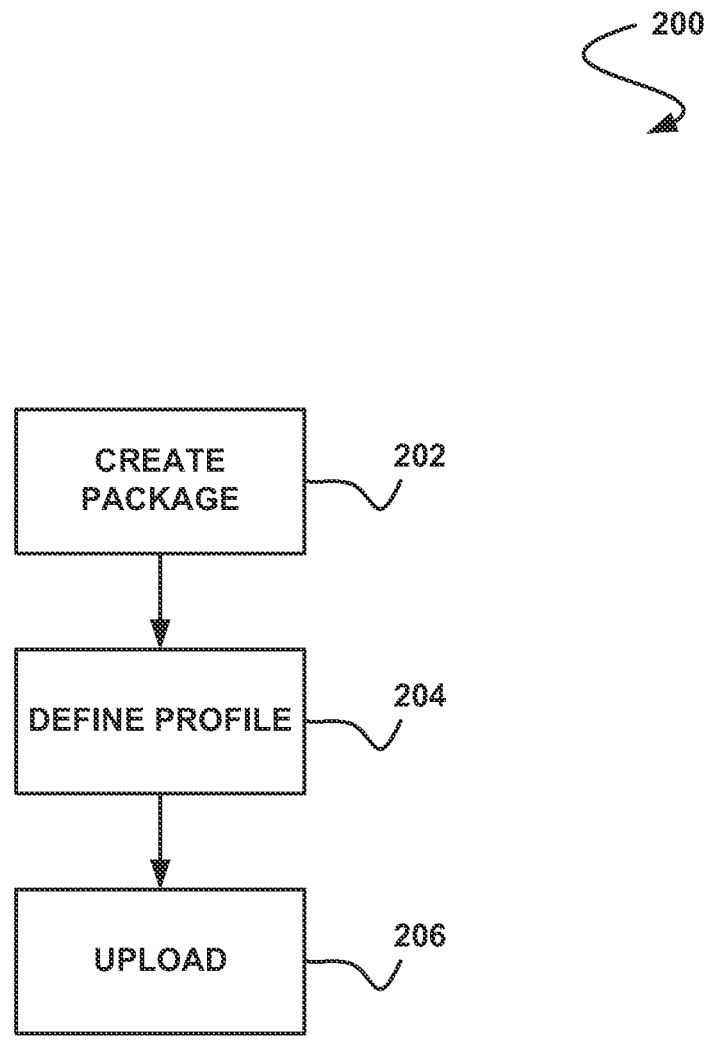
FIG. 2 shows a method for conditionally allowing an application of an entity access to data of another entity in an on-demand database service, in accordance with another embodiment.

FIG. 2 shows a method 200 for conditionally allowing an application of an entity access to data of another entity in an on-demand database service, in accordance with another embodiment. As an option, the present method 200 may be implemented in the context of the functionality of FIG. 1. Of course, however, the method 200 may be carried out in any desired environment. The aforementioned definitions may apply during the present description.

As shown, a package is created. See operation 202. In this case, the package may be created by a third party service such as an on-demand database service provider. Furthermore, the package may include a grouping of various objects (e.g. applications, etc.), custom logic, and/or computer code. For example, in various embodiments, the package may include a standalone client object to be installed on a client device (e.g. a data loader, an Outlook edition, etc.), a custom component (e.g. s-control, a custom tab, a web link, a URL formula field, etc.), an Apex trigger or web service (e.g. for creating follow-up tasks, etc.), and work flow items.

Once the package is created, a profile is defined. See operation 204. In this case, the profile may define an access level of the package. For example, in various embodiments, the profile may include an all access profile, a package access profile, or a custom access profile.

In one embodiment, the full access profile may allow for total access to information associated with an entity. Additionally, the package access profile may allow for access to information, applications, and data associated with the package. A custom access profile may allow for access to specific portions of the package and/or information associated with an entity.

Once the profile has been defined, the package is uploaded with the appropriate profile settings. See operation 206. In this case, the package may be uploaded to an on-demand database service instance associated with an entity. As an option, the on-demand database service provider may define an initial profile and upload the package.

Figure 3:
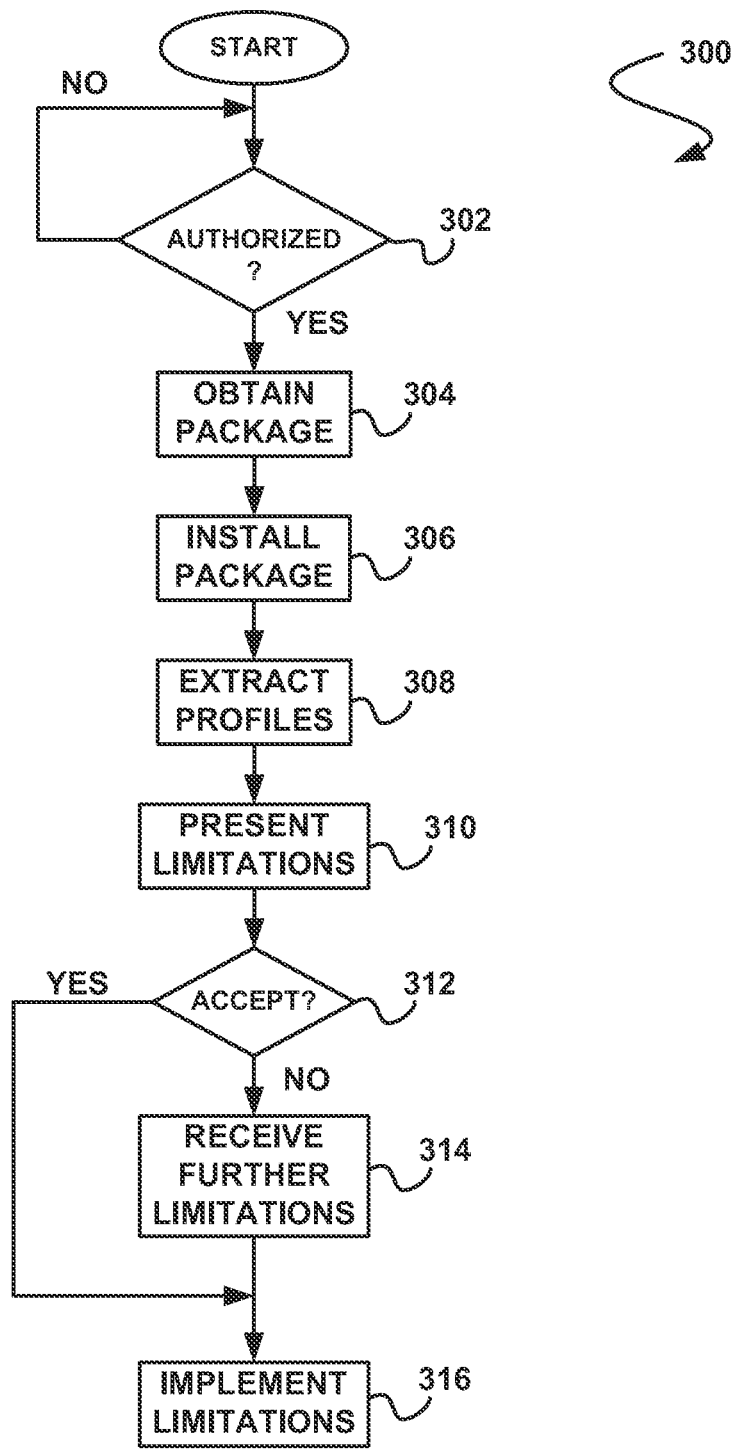
FIG. 3 shows a method for conditionally allowing an application of an entity access to data of another entity in an on-demand database service, in accordance with another embodiment.

FIG. 3 shows a method 300 for conditionally allowing an application of an entity access to data of another entity in an on-demand database service, in accordance with another embodiment. As an option, the present method 300 may be implemented in the context of the functionality of FIGS. 1-2. Of course, however, the method 300 may be carried out in any desired environment. Again, the aforementioned definitions may apply during the present description.

As shown, it is determined whether a user is authorized to obtain a package. See operation 302. In this case, the user may include any entity using an on-demand database service. Additionally, the determination of whether the user is authorized to obtain the package may include authenticating the user. In various embodiments, such authenticating may include verifying a user name, password, key, and/or various other authentication techniques.

If it is determined that the user is authorized to obtain the package, the user obtains the package. See operation 304. The package is then installed. See operation 306.

In one embodiment, the package may include an application. In this case, the application may be authenticated before any install is initiated. Thus, the installation of the package may be conditionally allowed based on the authentication.

Profiles are then extracted from the package. See operation 308. In this case, the profiles may be utilized to determine limitations on data and/or program access for the user. These limitations are then presented to the user. See operation 310.

It is then determined whether to accept or reject the limitations. See operation 312. For example, a first user may be presented with limitations indicating that an application of a second user will have access to data, applications, or information upon acceptance of the limitations. Depending on the situation, the first user may choose to grant more access or less access to the application of the second user.

If the user is satisfied with the limitations, the user may accept the limitations and the limitations will be implemented. See operation 316. On the other hand, the user may choose to reject the limitations and add or remove limitations. In this case, the user may present the limitations such that the further limitations are received. See operation 314. These limitations may then be implemented. In this way, the security profile of a user of an on-demand database service may be implemented to conditionally allow an application of another user access to data in the on-demand database.

For example, the user security profile may determine what objects (e.g. applications, code, etc.) a user may access and how a user may utilize each object type [e.g. create, read, update, and delete (CRUD)]. In one embodiment, the user security profile may be defined as part of the definition of a custom user control/web link.

For example, when a session is issued via a login or merge field, the session may be associated with a specific application programming interface (API) client. When that session is used for an API call, an on-demand database service may verify that the client applications for that session are authorized to perform the requested action against the provided object type. In some cases, the session may be restricted to the actions for which the user is authorized. This may make sessions much less valuable targets for malicious third parties. This may also make sessions less interchangeable, increasing the security of security features such as white listing.

In one embodiment, the user security profile may be defined by an application developer as part of a component definition and may be included in a package that includes that component definition. In this case, developers may be free to request any desirable privileges for the client applications.

As an option, when a user installs a package that includes a component with a security profile, the user may be presented with an interface as part of the install process which describes the privileges that are required for the application (e.g. a summary of the security profile). In this case, the user may be permitted to authorize the application in order to complete the installation. When a package is removed, the security profile may likewise be removed.

In one embodiment, security profiles may be defined at a package level and applied to all components in the package (e.g. s-controls, web links, custom clients, etc.). In this case, to configure the security profile of a component, the developer may choose between one of three levels of CRUD access. For example, the developer may choose CRUD access to the package (e.g. custom objects and standard objects with custom fields from the package), custom access (e.g. user chooses access level to package objects and standard objects or access to custom objects from outside the package), or universal CRUD (e.g. access to all objects). In this case, describe calls may reflect CRUD access for the application.

In addition to CRUD privileges, there may be a section of special privileges that can be enabled/disabled for the client application. For example, in various embodiments, special privileges may include write access to metadata, access to describe calls, and access to special methods (e.g. queryAll, undelete, merge, convertLead, process, etc.).

In one embodiment, the default security profile for new/existing applications may be access to the complete API. Developers may choose to reduce the privileges required for an application, and may do so at any point in a development cycle. As an option, the security profile may be displayed to installers.

In one embodiment, API client access may be allowed to any users data as long as the user is logged in with authorized credentials. In another embodiment, a user may have the ability to modify access limitations. For example, a user may have the ability to modify packageable custom components (e.g. s-controls, links, field URL formulas, Apex code web services, Apex code, etc.).

In this way, another user may have limited access to only objects or code in the same package, or standard entity access which may be limited to the access specified in the profile. Additionally, users may control the type of data being accessed by a particular partner client application, upgrade, or an extension. As an option, user or identification tokens (e.g. a user name string, etc.) may allow limited access to data to limit the security risks associated with unrestricted access. During an install, permissions in a packaged user security profile may be displayed in read-only mode to the installing user. This may give the user the ability to accept or reject the package installation based on the requested permissions.

Table 1 shows standard security profile options given to developer of an application, in accordance with one embodiment.

TABLE 1

|  | Read | Create | Update | Delete |
|---|---|---|---|---|
| Accounts | ✓ | ✓ | ✓ | ✓ |
| Contracts | ✓ | ✓ |  | ✓ |
| Opportunities | ✓ |  |  |  |

In addition to any access permissions requested by a user, there may be a list of objects and Apex packages accessed by packaged Apex code. In one embodiment, these values may come from Java Apex wrapping code and may require static analysis of the code.

Table 2 shows Apex code object access, in accordance with one embodiment.

TABLE 2

|  | Read | Create | Update |
|---|---|---|---|
| Events | ✓ |  |  |
| Tasks | ✓ | ✓ |  |

Table 3 shows Apex code delete access, in accordance with one embodiment.

TABLE 3

| Class Name | Package Name |
|---|---|
| accountDelete | accountUtils |
| contactDelete | contactUtils |
| deleteUtil | genericUtils |

Table 4 shows Apex code package access, in accordance with one embodiment.

TABLE 4

| Name | This Package |
|---|---|
| myPackage_cleanupTasks | ✓ |
| partnerPackage_createEvent |  |
| insertAccounts |  |

As an upgrade, entity permissions and user permission levels may change to add or remove privileges using an upgrade install. In some cases, cache may be cleared after the upgrade install is complete.

In one embodiment, there may be two types of packages, a base package and package extension. Both types of packages may be upgradeable if the base package type is managed. When a package is upgraded, the extension may be added, or an extension may be upgraded, such that user permissions may change. In case the permissions change, an install confirmation interface may highlight the differences between existing and new permissions.

At runtime, appropriate access to users may be enforced based on the access level configured in the security profile if one may be defined for the package. If the profile is not defined or if a user does not belong to a package, access may be assumed to be only limited by user profile permissions.

Permission checks may be implemented using different techniques. In one embodiment, the checks may be performed in the java level (e.g. on entity information, mayEdit, mayDelete, etc.). In another embodiment, the checks may be performed in a database at the PL/SQL level.

System Overview

Figure 4:
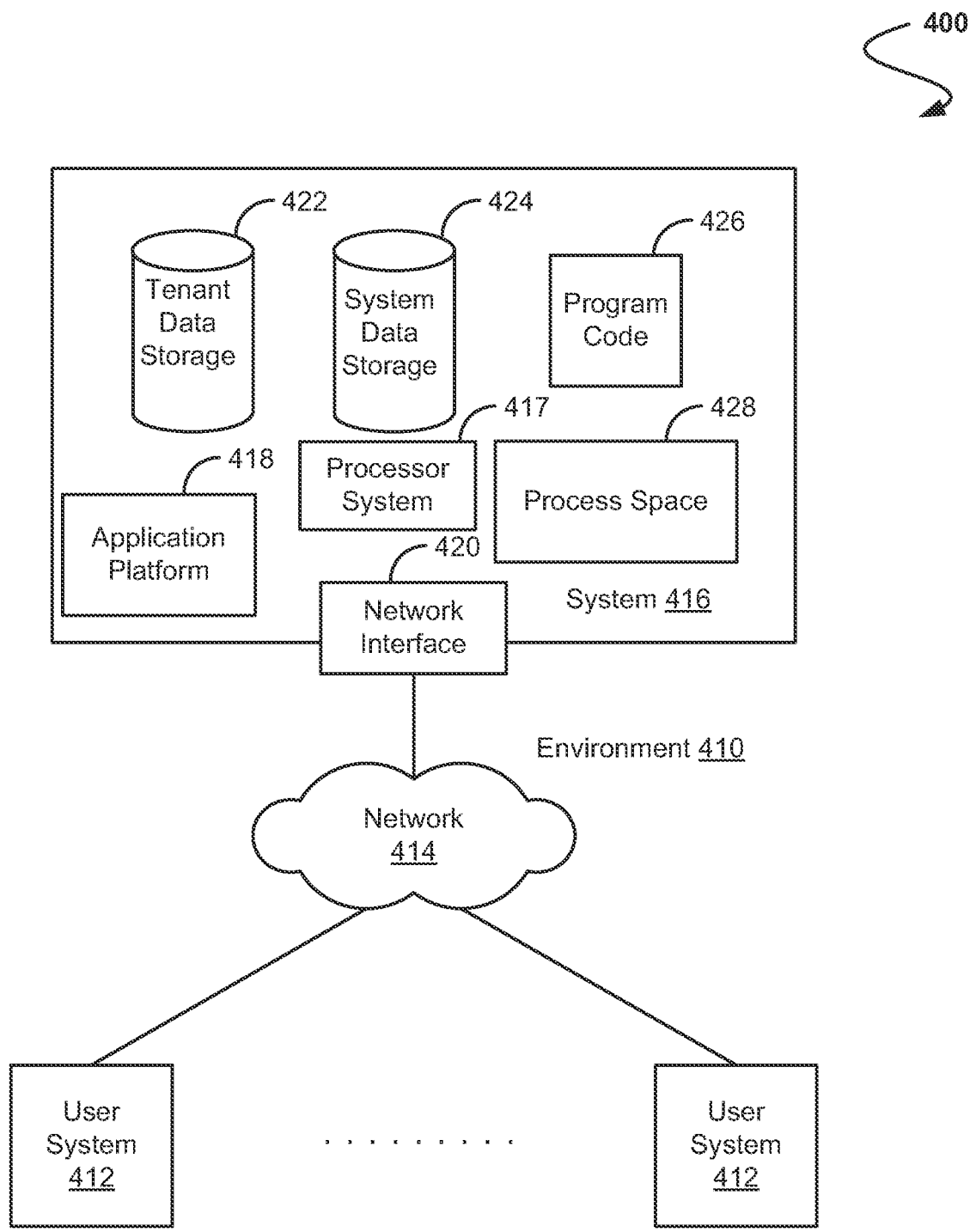
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
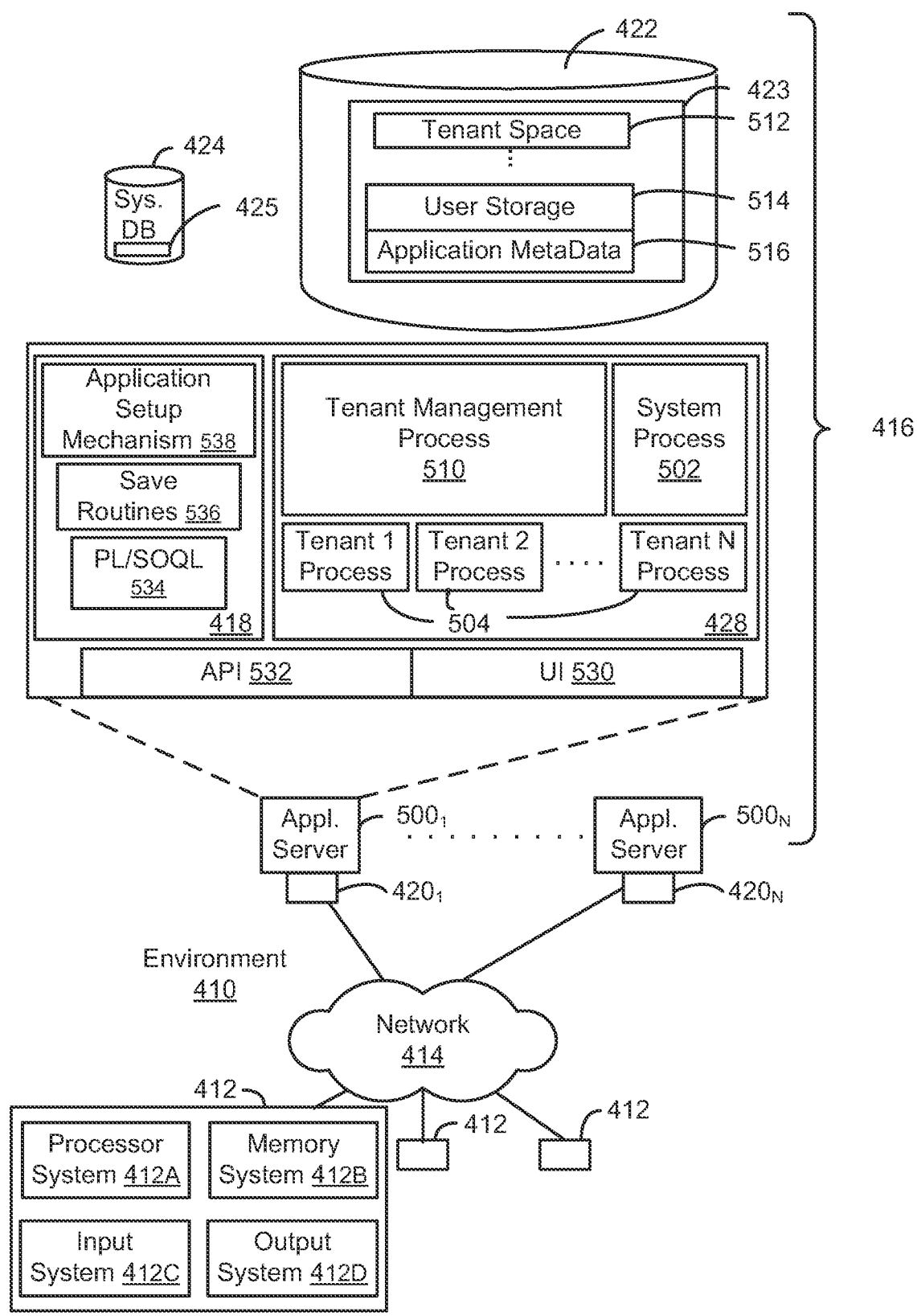
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, MAO % 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackball's, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multitenant, wherein system 416 handles storage of and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:

receiving a request from an application created by a first entity, wherein the application includes business logic and the request includes a request to access data of a second entity stored in a database of an on-demand database service; determining, utilizing a hardware processor, whether the application is authorized to access the data of the second entity stored in the database of the on-demand database service using a plurality of data access limitations associated with the application and indicated in a profile, wherein the data access limitations are presented to the second entity for acceptance by the second entity;

conditionally allowing the access to the data of the second entity stored in the database of the on-demand database service, based on the determination and the acceptance; and in response to an update associated with the application, requesting that the second entity accept the update associated with the application, and conditionally allowing the access to the data of the second entity stored in the database of the on-demand database service utilizing the application, based on the acceptance of the update associated with the application;

wherein the application is authenticated, and the application is conditionally installed based on the authentication;

wherein the data access limitations grant the application created by the first entity access to the data of the second entity;

wherein the first entity and the second entity are different tenants of the on-demand database service, such that the on-demand database service processes requests for each of the first entity and the second entity and stores information for each of the first entity and the second entity, and wherein the profile indicating the data access limitations granting the application created by the first entity access to the data of the second entity provides sharing with the first entity the data of the second entity that is stored in the database of the on-demand database service;

wherein a package includes the application and the data access limitations, and the package is installed by the second entity.

2. The method of claim 1, wherein the first entity and the second entity include different organizations.

3. The method of claim 1, wherein the first entity and the second entity include different divisions of a single organization.

4. The method of claim 1, wherein the data access limitations are determined by the second entity.

5. The method of claim 1, wherein the data access limitations include a plurality of data access levels.

6. The method of claim 1, wherein the data access limitations include limitations on at least one type of the data of the second entity stored in the database of the on-demand database service that can be accessed.

7. The method of claim 1, wherein the data access limitations include limitations on at least one action that may be performed on the data of the second entity stored in the database of the on-demand database service.

8. The method of claim 1, and further comprising receiving the update associated with the application.

9. The method of claim 8, and further comprising presenting the update to the second entity for acceptance by the second entity, and conditionally allowing the access to the data of the second entity stored in the database of the on-demand database service utilizing the update, based on the acceptance.

10. The method of claim 1, wherein the application is served by the on-demand database service.

11. A non-transitory machine-readable medium carrying one or more sequences of instructions which, when executed by one or more processors, cause the one or more processors to carry out the steps of:

receiving a request from an application created by a first entity, wherein the application includes business logic and the request includes a request to access data of a second entity stored in a database of an on-demand database service;

determining whether the application is authorized to access the data of the second entity stored in the database of the on-demand database service using a plurality of data access limitations associated with the application and indicated in a profile, wherein the data access limitations are presented to the second entity for acceptance by the second entity;

conditionally allowing the access to the data of the second entity stored in the database of the on-demand database service, based on the determination and the acceptance; and in response to an update associated with the application, requesting that the second entity accept the update associated with the application, and conditionally allowing the access to the data of the second entity stored in the database of the on-demand database service utilizing the application, based on the acceptance of the update associated with the application;

wherein the application is authenticated, and the application is conditionally installed based on the authentication;

wherein the data access limitations grant the application created by the first entity access to the data of the second entity;

wherein the first entity and the second entity are different tenants of the on-demand database service, such that the on-demand database service processes requests for each of the first entity and the second entity and stores information for each of the first entity and the second entity, and wherein the profile indicating the data access limitations granting the application created by the first entity access to the data of the second entity provides sharing with the first entity the data of the second entity that is stored in the database of the on-demand database service;

wherein a package includes the application and the data access limitations, and the package is installed by the second entity.

12. An apparatus, comprising:
a processor; and
one or more stored sequences of instructions which, when executed by the processor, cause the processor to carry out the steps of:

receiving a request from an application created by a first entity, wherein the application includes business logic and the request includes a request to access data of a second entity stored in a database of an on-demand database service;

determining whether the application is authorized to access the data of the second entity stored in the database of the on-demand database service using a plurality of data access limitations associated with the application and indicated in a profile, wherein the data access limitations are presented to the second entity for acceptance by the second entity;

conditionally allowing the access to the data of the second entity stored in the database of the on-demand database service, based on the determination and the acceptance; and in response to an update associated with the application, requesting that the second entity accept the update associated with the application, and conditionally allowing the access to the data of the second entity stored in the database of the on-demand database service utilizing the application, based on the acceptance of the update associated with the application;

wherein the application is authenticated, and the application is conditionally installed based on the authentication;

wherein the data access limitations grant the application created by the first entity access to the data of the second entity;

wherein the first entity and the second entity are different tenants of the on-demand database service, such that the on-demand database service processes requests for each of the first entity and the second entity and stores information for each of the first entity and the second entity, and wherein the profile indicating the data access limitations granting the application created by the first entity access to the data of the second entity provides sharing with the first entity the data of the second entity that is stored in the database of the on-demand database service; wherein a package includes the application and the data access limitations, and the package is installed by the second entity.

13. A method for transmitting code for use in a multi-tenant database system on a transmission medium, the method comprising:

transmitting code for receiving a request from an application created by a first entity, wherein the application includes business logic and the request includes a request to access data of a second entity stored in a database of an on-demand database service;

transmitting code for determining, utilizing a hardware processor, whether the application is authorized to access the data of the second entity stored in the database of the on-demand database service using a plurality of data access limitations associated with the application and indicated in a profile, wherein the data access limitations are presented to the second entity for acceptance by the second entity;

transmitting code for conditionally allowing the access to the data of the second entity stored in the database of the on-demand database service, based on the determination and the acceptance;

transmitting code for, in response to an update associated with the application, requesting that the second entity accept the update associated with the application, and conditionally allowing the access to the data of the second entity stored in the database of the on-demand database service utilizing the application, based on the acceptance of the update associated with the application; and wherein the application is authenticated, and the application is conditionally installed based on the authentication;

wherein the data access limitations grant the application created by the first entity access to the data of the second entity;

wherein the first entity and the second entity are different tenants of the on-demand database service, such that the on-demand database service processes requests for each of the first entity and the second entity and stores information for each of the first entity and the second entity, and wherein the profile indicating the data access limitations granting the application created by the first entity access to the data of the second entity provides sharing with the first entity the data of the second entity that is stored in the database of the on-demand database service;

wherein a package includes the application and the data access limitations, and the package is installed by the second entity.

* * * * *